INVENTORS.
GEORGE ELLNER
SIDNEY ELLNER by Sparrow and Sparrow

ATTORNEYS.

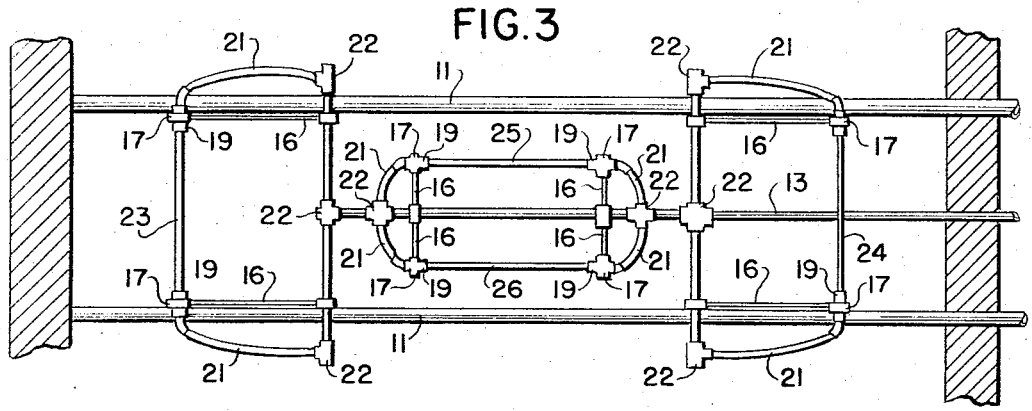
FIG.3
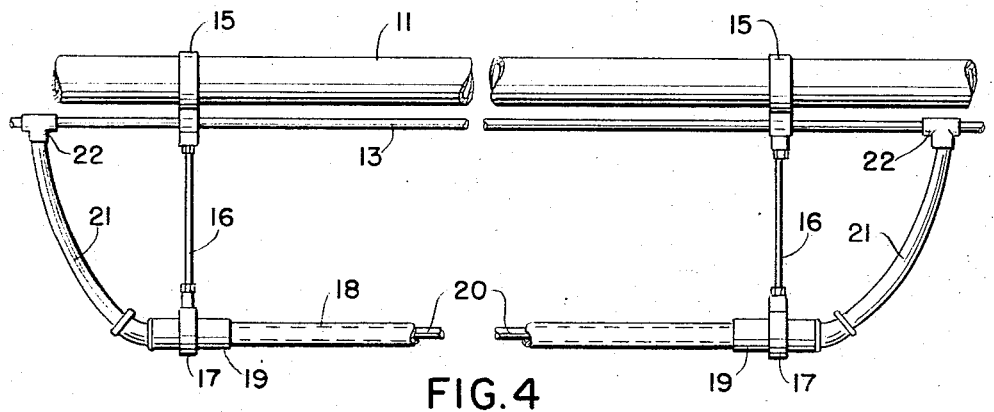
FIG.4
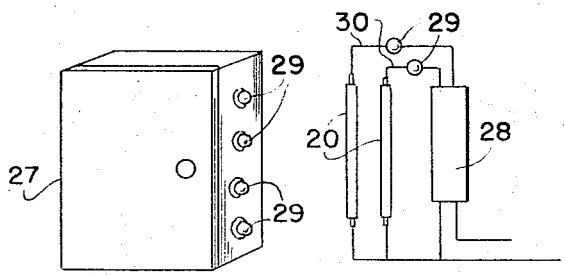
FIG.5 FIG.6
INVENTORS.
GEORGE ELLNER
SIDNEY ELLNER
by Sparrow and Sparrow
ATTORNEYS.

United States Patent Office 3,366,441
Patented Jan. 30, 1968

3,366,441
ULTRAVIOLET SYSTEM FOR CONTROL OF ALGAE AND SLIME WITHIN HUMIDITY CONTROL AND SIMILAR SYSTEMS
George Ellner and Sidney Ellner, Hartsdale, N.Y., assignors to Ultra Dynamics Corporation, Brooklyn, N.Y., a corporation of Delaware
Filed Feb. 10, 1964, Ser. No. 343,887
18 Claims. (Cl. 21—74)

ABSTRACT OF THE DISCLOSURE

Air humidifying and sterilizing system in air conditioning and air purifying installations employing ultravolet and/or ozone producing radiation for the control of algae and slime within humidity control, cooling towers and similar systems, and for providing a germ-free and bacteria-free environment.

---

This invention relates to humidity control and sterilizing systems, air conditioning devices and the like atmosphere control and purification installations in general and to devices for inhibiting the growth of algae and similar micro-organisms on such humidity control systems and their environs in particular.

This invention further relates to systems employing ultra-violet and/or ozone producing radiation for the control of algae and slime within humidity control, cooling towers and similar systems, and for providing a germ-free and bacteria-free environment.

It is known that certain electrical and electromagnetic radiations of predetermined wave lengths have remarkable bactericidal, sterilizing, purifying, germicidal and other chemical actinic powers. By reason of the power of destroying, reducing and inhibiting the growth and number of bacteria, yeasts, molds, algae, virus and other micro-organisms or other undesirable germs, light rays of short wave length, preferably at the ultraviolet range of the spectrum, have been used for the sterilization and purification of liquids and fluids.

It is a common occurrence to find algae and other slime forming micro-organisms growing on the surfaces of humidity control areas. This growth can become so acute that it clogs spray heads, heat exchangers, etc. The shutdown time and the labor required to clean out the system can be very costly.

It has been found necessary to create and to maintain a closely controlled atmosphere in certain areas and rooms in which articles of high purity are manufactured, such as, for example, certain pharmaceuticals, high precision instruments, electronics and the like. Such an atmosphere is mainly characterized by the absence of all and any dust particles, by a humidity of the air which is controlled within narrow limits and also by the absence of obnoxious germs. Obviously, the system must be equipped with operating elements which guarantee a consistently reliable function at all times.

Basically, such systems consist of a screen of finely dispersed water through which the air which has to be purified and humidified is blown. The means for generating such a water screen usually are sprinklers or jet nozzles. However, the efficiency and consistently proper function of these sprinklers and/or jet nozzles rely largely upon a good maintenance, particularly with respect to keeping the surfaces of these sprinklers and/or jet nozzles very clean and free from all kinds of deposits which inevitably are carried by the water. Such deposits can be of inorganic nature, which can be eliminated by filtration, or they can be caused by micro-organisms, such as algae or the like which form slimy coatings on all contacted surfaces and which eventually seriously clog the sprinklers and/or jet nozzles by their growing thereon. The cleaning of any such water-spraying system causes periodic shut-downs and constitutes a great deal of costly labor.

It is known that radiations having certain specific wave length have tremendous bactericidal, sterilizing, purifying and germicidal potency. The germicidal properties of these radiations or rays have been used advantageously for destroying the micro-organisms in the water before they have a chance to grow and for preventing a deposit or accumulation of such micro-organisms and the slimy deposits thereof on pipe lines, fixtures and the like.

The invention consists in such novel features, construction arrangements, combinations of parts and improvements as may be shown and described in connection with the apparatus herein disclosed by way of example only and as illustrative of a preferred embodiment.

Objects and advantages of the invention will be set forth in part hereafter and in part will be obvious herefrom or may be learned by practicing the invention, the same being realized and attained by means of the instrumentalities and combinations pointed out in the appended claims.

It is a principal object of the present invention to provide a system which utilizes the germicidal effectiveness of ultraviolet and/or ozone producing radiation in such a manner as to prevent slime and algae accumulation on materials and maintaining a sterilized environment by destroying the micro-organisms before they have a chance to grow.

Another object of the present invention is to provide apparatus for destroying all of the water-borne and airborne micro-organisms, so as to provide a bacteria-free atmosphere as required in certain critical areas.

Yet another object of the present invention is to provide a combination of ultraviolet and/or ozone producing devices for controlling the growth of algae and the like slime-forming micro-organisms in humidity control and the like systems.

A further object of the present invention is to provide a system of ultraviolet ray-emitting and ozone producing sources irradiating humidity control devices and/or environments.

Still another object of the present invention is to provide an air humidifying system combined with a purifying system for germ-free rendering of the water or other fluid used in humidifying devices.

Furthermore, it is an object of the present invention to provide ultraviolet ray-emitting devices for use in humidifying and purifying systems which can be easily installed, properly maintained and replaced when needed.

Yet a further object of the present invention resides in the provision of a waterproof holder or fixture for the ultra-violet ray-emitting tube or lamp.

Various further and more specific purposes, features and advantages will clearly appear from the detailed description given below taken in connection with the accompanying drawings which form part of this specification and illustrate merely by way of example one embodiment of the device of the invention. In the following description and in the claims, parts will be identified by specific names for convenience, but such names are intended to be as generic in their application to similar parts as the art will permit. Like reference characters denote like parts in the several figures of the drawings, in which:

FIG. 3 is a plan view of the arrangement of the ultraviolet ray-emitting and transmitting sources at the top of the system shown in FIG. 1;

FIG. 4 shows one of the ultraviolet ray-emitting and transmitting sources displayed in FIGS. 1 and 2, in more detail;

FIG. 5 illustrates an electric control cabinet of the system;

FIG. 6 is a circuit diagram showing the basic electrical components of the system;

Figure 1:
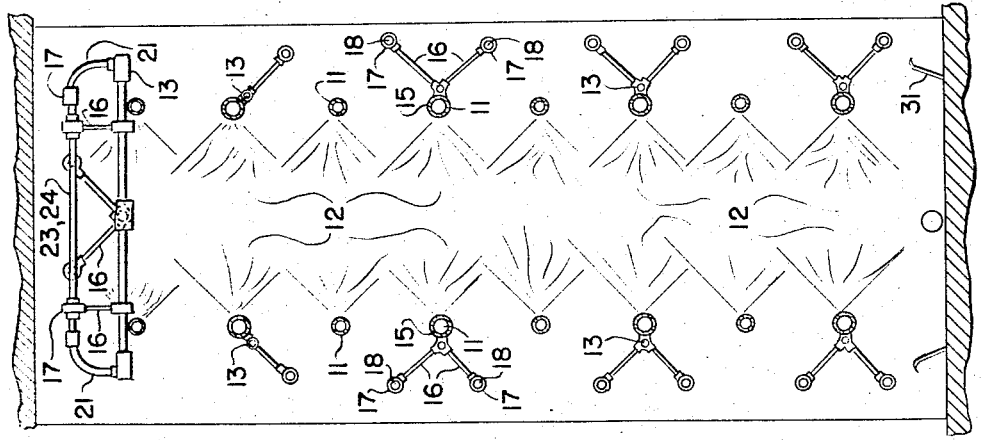
FIG. 1 is a side view of an air humidifying system, according to the invention, with ultraviolet ray-emitting and transmitting sources attached.

Referring now in more detail to the drawings illustrating a preferred embodiment by which the invention may be realized, there is shown in FIG. 1 an air humidifying system which is composed of two vertically arranged banks of water pipes 11 which have lines of small orifices or nozzles or the like water atomizing devices spaced on them in such manner that the sprays 12 of the two banks of pipes 11 are directed toward one another. Thus, a complete fine screen of water is created through which the air which is to be humidified and purified or sterilized is blown. The spraying or atomizing devices per se are not further detailed because they are well-known and of a commercially traded nature.

Spaced apart and arranged on every second one of pipes 11 are electrical conduits 13, held on said pipes 11 by clamps 14. A series of further clamps 15 carry arms 16 which in turn have pipe clamps 17 on their free ends. The arms 16, which are angularly disposed (preferably 45 degrees) with relation to the axes of pipes 11, as seen in FIG. 1, hold in pairs the ultraviolet-transmitting jackets, such as, for example, the jackets 18 in pipe clamps 17 by way of waterproof fixtures 19, detailed in FIG. 8. Ultraviolet ray-emitting and/or ozone producing devices, such as, for example, the lamps 20 are surrounded by the jackets 18 and are held in the fixtures 19.

Flexible waterproof conduit assemblies 21 are connected to the waterproof fixtures 19, on one side, and to the feed line conduits 13 on the other side. Obviously, the connections 22 on the feed line conduits 13 also are waterproof.

Figure 2:
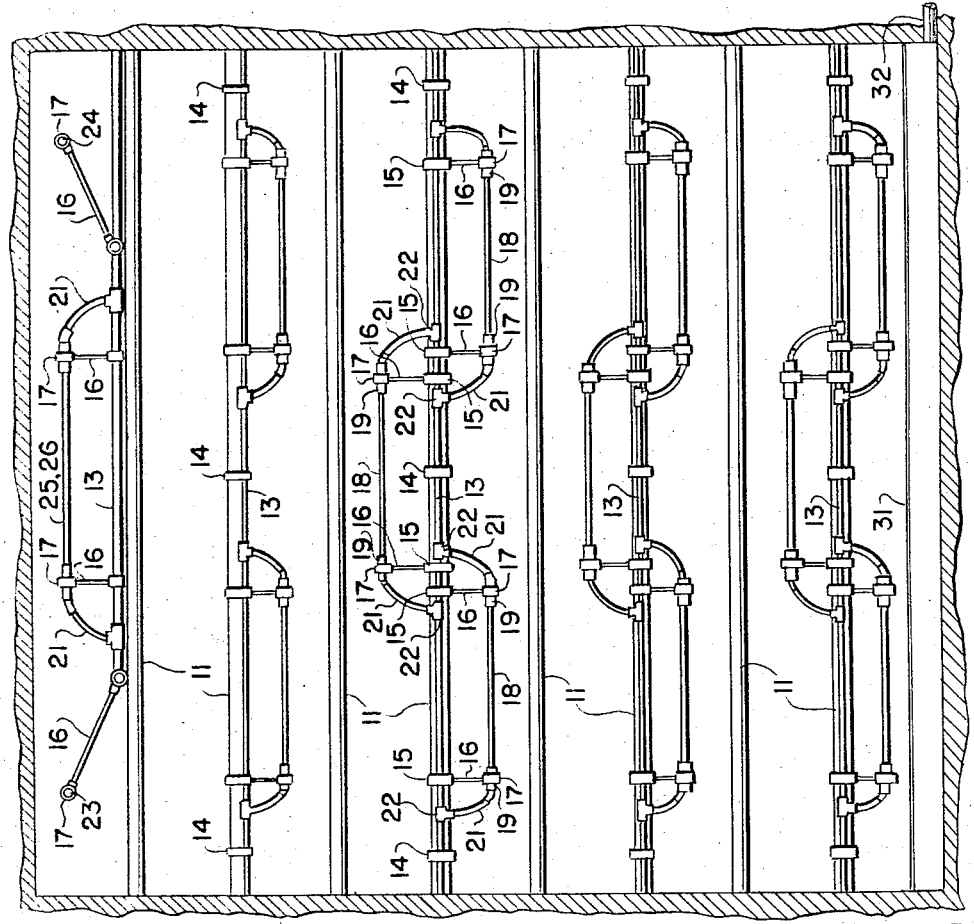
FIG. 2 is a front view of the system shown in FIG. 1.

The arrangement of the pipe lines and the ultraviolet ray-emitting tubes 20 are shown in FIG. 2. The proper spacing and distribution of these devices provide for a complete control of the entire area through which the air which is to be humidified and purified is blown. A preferable installation of four tubes at the top of the two banks of pipes 11 is shown in FIG. 3, wherein two ultraviolet lamps 23, 24 are laid across the uppermost two of the pipes 11, and wherein two ultraviolet lamps 25, 26 are placed parallel to the uppermost pipes 11. Obviously, these four tubes are held in place by the same kind of arms 16 and by the same kind of waterproof jackets 19 and connectors, as described above.

The entire system is designed and built in such manner, as shown in FIGS. 1, 2 and 3, that all surfaces of pipes 11 and of the surrounding areas are subjected to ultraviolet and/or ozone producing radiation, by which any growth of micro-organisms on these surfaces is inhibited and the areas there-surrounding sterilized. All control elements, such as electrical control panels 27, are located outside the area in which the humidification and purification takes place. In each one of the control panels 27, one for every pair of ultraviolet radiation lamps or tubes 20, are two powerful ballasts 28 for instantaneous firing of the lamps 20, and voltage indicating means, such as bulbs 29 in each of the feed lines 30 and/or audible signals (not shown) leading to conduits 13, so that any defect or failure of an ultraviolet lamp of the system can be readily detected (FIG. 6).

Figure 7:
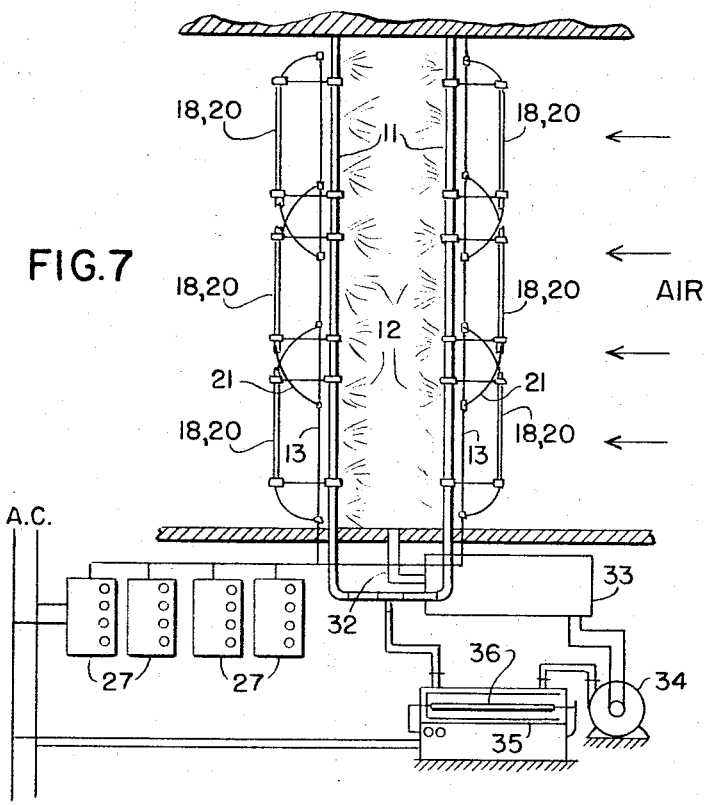
FIG. 7 is a schematic view of the complete humidifying and purifying system, reduced in scale.

The water or other fluid that is sprayed and atomized for humidifying the air is collected in a pan 31 below the banks of pipes 11 and is disposed of by a discharge pipe 32. However, this water also can be recirculated in a closed circuit by collecting it in a tank 33 (FIG. 7) and by pumping it back into the humidifying system by a suitable pump 34. It is obvious that this water also can be subjected to germicidal and bactericidal treatment in a purifying container 35, in which it is exposed to ultraviolet radiation produced by lamp 36 before it is used again in the humidifying system. Thereby, the air that is blown through the humidifying system is not only washed, humidified to the required degree of relative humidity and rendered dust-free, but also is completely sterilized, purified and rendered bacteria-free. This is an important feature for the air conditioning of special so-called "white rooms" in which pharmaceutical products, and food products, such as baby foods and the like sensitive products which require a high degree of purity, are manufactured. Obviously, there are many other applications in which a controlled humidified atmosphere is needed and where the growth of algae, slime and the like micro-organisms is favored by the ambient temperature. In such cases, the ultraviolet irradiating and/or ozone producing device for preventing the deposit and growth of such micro-organisms in the air humidifying system, according to the present invention, offers a practical and highly efficient solution of the problem.

Due to the humid nature of the area to be treated, and the fact that an assembly which radiates 360 degrees is required, a new type of fixture has been developed. The fixture consists of snap-on sockets which are fittted into a special molded neoprene sleeve. The neoprene sleeve is so designed that it forms a watertight seal about a fused quartz jacket which is used to protect the ultraviolet lamp from moisture. A machined metal gland fits over the neoprene sleeve on either end of the quartz jacket. This gland is threaded to receive a watertight conduit connector which houses the electrical wires. The fixture is held in place by a clamp hanger arrangement which is suspended from rigid electrical conduit. The electrical power for the ultraviolet lamp or other source is supplied from a master control box, located outside the humid area, and piped through to the lamps by means of the conduit.

Figure 8:
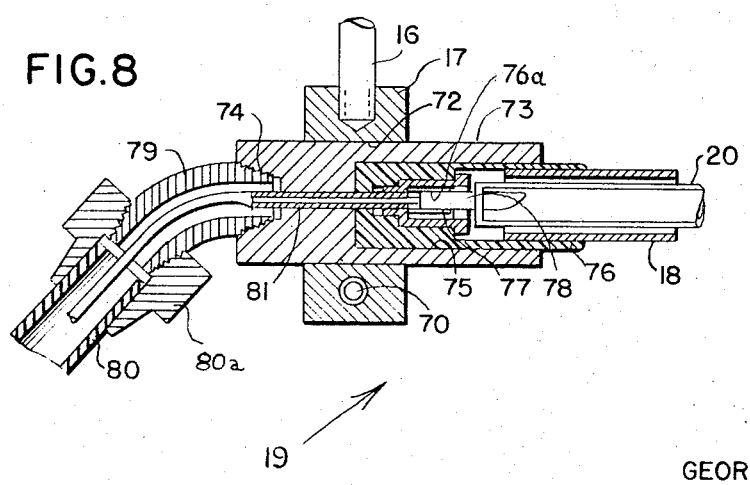
FIG. 8 is a longitudinal sectional view, partly broken away, of a preferred fixture for holding an ultraviolet ray tube or lamp.

A novel and efficient fixture 19 for waterproof holding of the ultraviolet-transmitting means, such as the quartz jacket 18 and ultraviolet ray-emitting lamps 20 is shown in FIG. 8. The enlargement 17 of arm 16 provides a clamping device having a clamping screw 70. Passing through bore 72 of enlargement 17 is a gland or bushing 73, preferably metal, which has a threaded hole 74 at one end and an enlarged bore 75 at its other end. An elastic or resilient sleeve or socket holder 76 made of rubber, neoprene or the like elastic material, is snugly fitted into bore 75. The front end of holder 76 is adapted to receive the end of jacket 18 which protects or shields the lamp 20. The rear end of housing or socket holder 76 is closed and holds an insulating shield 76a within which is secured a contact spring or snap-on socket 77 for end terminal 78 of the ultraviolet radiation source, such as lamp 20. The conduit assembly 21 comprises a preferably 45 degree conduit connector or elbow 79 which threadedly engages the end 74 of gland or bushing 73. Conductor or lead 81 passes through a hold in bushing 73 and connects with socket 77. Flexible, waterproof conduit 80 has a coupling 80a which threadedly engages conduit 79. The insulated wire lead 81, which passes through the closed end of socket holder 76, connects with socket 77.

Wherever the term ultraviolet radiation or ray-emitting source is used in the specification and claims, it is understood as meaning a source which radiates ultraviolet and/or produces ozonation.

Some ultraviolet lamps emit not only the bactericidal wave lengths, but also a considerable amount of the still shorter, ozone-forming wave lengths, and ozone has long been recognized as an efficient bactericidal agent (in its own right, even without ultraviolet) and, at the same time, ozone oxidizes and destroys many types of odors, without the use of chemicals or any other agents, a valuable feature. The long-used "static discharge type" of ozonators can be toxic, since they also generate certain obnoxious, dangerous nitrogenous gases, whereas the ozone-forming wave lengths emitted by the aforesaid combination ultraviolet-ozone lamps do not generate the dangerous nitrogenous gases. The described system is equally useful in cases where the air is dehumidified, as well as where humidification is employed, or where washing, filtering, heating or cooling or any other phase of air conditioning is employed, where sterilization of the air is desired, without the use of heat or chemicals.

While the invention has been described and illustrated with respect to a certain preferred example which gives satisfactory results, it will be understood by those skilled in the art after understanding the principle of the invention, that various other changes and modifications may be made without departing from the spirit and scope of the invention and it is intended therefore in the appended claims to cover all such changes and modifications.

We claim:

1. An air humidifying and sterilizing system in air conditioning and air purifying installations comprising a plurality of pipes provided with spraying means, ultraviolet radiation sources placed at a distance alongside said pipes, arms attached to said pipes, said arms being spaced apart from one another, fixtures connected to said arms, quartz jackets supported by said fixtures, said sources being arranged in said jackets, and flexible, electrical conduits connected to said sources, said sources emitting ultraviolet rays for preventing the depositing and growth of algae, slime and similar micro-organisms on said pipes and sterilizing the media therebetween.

2. An air humidifying and sterilizing system according to claim 1, wherein at least some of said arms are disposed at an angle with relation to the axes of said pipes whereby said sources irradiate the environment between adjacent pipes.

3. An air humidifying and sterilizing system according to claim 1, wherein at least some of said arms are disposed at an angle of substantially 45 degrees with relation to the axes of said pipes whereby said sources irradiate the environment between adjacent pipes.

4. An air humidifying and sterilizing system according to claim 1, said fixtures each comprising a member, means for supporting said member from said arm, said member having a bore, a resilient socket holder fitting said bore, an electric socket contained in said holder, an electric conductor connected to said socket and projecting from said holder and in sealing contact therewith, said holder being adapted to receive an end portion of said jacket and said socket being adapted to receive a terminal of one of said ray-emitting sources.

5. An air humidifying and sterilizing system according to claim 4, said fixture further comprising a conduit means connected to said member for said conductor.

6. An air humidifying and sterilizing system in air conditioning and air purifying installations comprising a plurality of pipes provided with spraying means, a plurality of ultraviolet radiation sources placed at a distance alongside said pipes, said sources directly irradiating said pipes and the media therebetween, a plurality of holding arms attached to said pipes, said arms being spaced apart from one another, removable waterproof fixtures connected to said arms, a plurality of quartz jackets removably supported in said fixtures, said jackets enveloping said sources, flexible electrical conduits connected to said sources, and electric control means connected with said sources, said control means having failure indicating means.

7. An air humidifying system in air conditioning and air purifying installations, having a plurality of pipes provided with fluid spraying means, comprising: a plurality of first ultraviolet ray-emitting sources placed at a distance alongside said pipes, said sources directly irradiating said water pipes, a plurality of holding arms attached to said pipes, said arms being spaced apart from one another, removable waterproof fixtures connected to said arms, a plurality of quartz jackets removably supported in said fixtures, said jackets enveloping said sources, flexible electrical conduits connected to said sources, electric control means connected with said sources, said control means having failure indicating means, and water purifying means arranged ahead of said plurality of pipes, said purifying means including at least one second ultraviolet ray-emitting source in immediate contact with said fluid.

8. An air humidifying system in air conditioning and air purifying installations according to claim 7, and comprising fluid recirculating means having said fluid purifying means incorporated therein.

9. An air humidifying system in air conditioning and air purifying installations having a plurality of pipes provided with water spraying means, comprising: ultraviolet ray-emitting sources placed at a distance alongside said pipes, arms attached to said pipes, said arms being spaced apart from one another, waterproof fixtures at the free ends of said arms, quartz jackets held in place in said fixtures, said ultraviolet ray-emitting sources waterproofly arranged in said quartz jackets, and flexible, waterproof electrical conduits connected to said ultraviolet ray-emitting sources, said ultraviolet rays preventing the depositing and growing of algae, slime and similar micro-organisms on said pipes.

10. An air humidifying and sterilizing system comprising a plurality of pipes provided with water spraying means, a plurality of ultraviolet ray-emitting lamps disposed adjacent said pipes, a plurality of arms attached to said pipes, waterproof fixtures connected to said arms, a plurality of ultraviolet-transmitting jackets removably supported in said fixtures, said lamps being enveloped by said jackets for irradiating said pipes, flexible electrical conduits connected to said lamps, and electric control means connected with said lamps, said control means having failure indicating means.

11. An air humidifying and sterilizing system according to claim 10, wherein at least some of said arms are disposed at an angle with relation to the axes of said pipes whereby said lamps irradiate the environment between adjacent pipes.

12. An air humidifying and sterilizing system according to claim 10, wherein at least some of said arms are disposed at an angle of substantially 45 degrees with relation to the axes of said pipes whereby said lamps irradiate the environment between adjacent pipes.

13. An air humidifying and sterilizing system according to claim 10, said fixtures each comprising a member, means for supporting said member from said arm, said member having a bore, a resilient socket holder fitting said bore, an electric socket contained in said holder, an electric conductor connected to said socket and projecting from said holder and in sealing contact therewith, said holder being adapted to receive an end portion of said jacket and said socket being adapted to receive a terminal of one of said ray-emitting lamps.

14. An air humidifying and sterilizing system according to claim 13, said fixture further comprising a conduit means connected to said member for said conductor.

15. An air humidifying and sterilizing system comprising a plurality of pipes provided with water spraying means, a plurality of first ultraviolet ray-emitting lamps disposed adjacent said pipes, a plurality of arms attached to said pipes, waterproof fixtures at the free ends of said arms, a plurality of ultraviolet-transmitting jackets removably held in place in said fixtures, said lamps being enveloped by said jackets for irradiating said pipes, flexible waterproof electrical conduits connected to said lamps, electric control means connected with said lamps, said control means having failure indicating means, and water purifying means arranged ahead of said plurality of pipes, said purifying means including at least one second ultraviolet ray-emitting lamp in immediate contact with said water.

16. An air humidifying and sterilizing system according to claim 15, and comprising water recirculating means having said water purifying means incorporated therein.

17. An air uhmidifying and sterilizing system comprising a plurality of pipes provided with water spraying means, a plurality of ultraviolet ray-emitting and ozone producing lamps disposed adjacent said pipes, a plurality of arms attached to said pipes, waterproof fixtures connected to said arms, a plurality of ultraviolet-transmitting jackets removably supported in said fixtures, said lamps being enveloped by said jackets, and adapted to irradiate said pipes and the media therebetween, electrical conduits connected to said lamps, and electric control means connected with said lamps, said control means having failure indicating means.

18. An air humidifying system in air conditioning and air purifying installations comprising a plurality of pipes provided with spraying means, ultraviolet ray-emitting and ozone producing sources placed at a distance alongside said pipes, arms attached to said pipes, said arms being spaced from one another, fixtures connected to said arms, ultraviolet-transmitting jackets supported by said fixtures, said sources being arranged in said jackets respectively, electrical conduits connected to said sources, said sources emitting ultraviolet rays for preventing the depositing and growth of algae, slime and similar microorganisms on said pipes and freeing the media between said pipes from bacteria and the like.

References Cited

UNITED STATES PATENTS

| 2,343,338 | 3/1944 | Steel | 21—53 |
| 2,484,559 | 10/1949 | Ellner | 250—43 |
| 2,485,267 | 10/1949 | Ellner | 250—43 |
| 2,889,837 | 6/1959 | Braun et al. | 21—102 X |
| 3,174,819 | 3/1965 | Clayton | 21—54 X |

FOREIGN PATENTS 1,101,958  4/1955  France.

MICHAEL E. ROGERS, *Primary Examiner*.